United States Patent
Park

(10) Patent No.: US 8,223,607 B2
(45) Date of Patent: *Jul. 17, 2012

(54) METHOD AND APPARATUS FOR MANAGING A OVERWRITE RECORDING ON OPTICAL DISC WRITE ONCE

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 1688 days.

This patent is subject to a terminal disclaimer.

(21) Appl. No.: 10/563,154

(22) PCT Filed: Jul. 5, 2004

(86) PCT No.: PCT/KR2004/001653
§ 371 (c)(1),
(2), (4) Date: Jan. 4, 2006

(87) PCT Pub. No.: WO2005/004123
PCT Pub. Date: Jan. 13, 2005

(65) Prior Publication Data
US 2006/0171271 A1    Aug. 3, 2006

(30) Foreign Application Priority Data
Jul. 4, 2003   (KR) .................. 10-2003-0045316

(51) Int. Cl.
*G11B 7/00*   (2006.01)
(52) U.S. Cl. .............. 369/53.17; 369/47.13; 711/111; 711/154
(58) Field of Classification Search ............. 369/47.13, 369/53.17
See application file for complete search history.

(56) References Cited

U.S. PATENT DOCUMENTS

| 4,558,446 A | 12/1985 | Banba et al. |
| 4,733,386 A | 3/1988 | Shimoi |
| 4,807,205 A | 2/1989 | Picard |

(Continued)

FOREIGN PATENT DOCUMENTS

CN    1134017    10/1996

(Continued)

OTHER PUBLICATIONS

Search Report issued Dec. 5, 2008 by the European Patent Office in counterpart European Patent Application No. 05792965.5-1232.

(Continued)

*Primary Examiner* — Wayne Young
*Assistant Examiner* — Dionne Pendleton
(74) *Attorney, Agent, or Firm* — Harness, Dickey & Dickey

(57) ABSTRACT

The present invention provides an overwrite method of a write-once optical disc and apparatus thereof, by which a logical overwrite is enabled by varying an overwrite system according to a recording mode to enhance efficiency of disc use. The present invention includes the step of performing a replacement recording on a data area within the optical disc with overwrite-requested data in a specific recording-completed area within the optical disc in a sequential recording mode (SRM) wherein a logical overwrite is executed to maintain continuity of a user data area by the replacement recording. And, the present invention includes the step of performing a replacement recording on a spare area within the optical disc with overwrite-requested data in a specific recording-completed area within the optical disc in a random recording mode (RRM) wherein a size of the spare area for allocation is determined on disc initialization for the replacement recording.

6 Claims, 12 Drawing Sheets

- LSN : Logical Sector Number
- TDMA : Temporary Disc Management Area
- TDFL : Temporary DFL
- TDDS : Temporary DDS (Disc Definition Structure)
- SBM : Space Bit-Map
- SRRI : Sequential Recording Range Information

U.S. PATENT DOCUMENTS

| | | | |
|---|---|---|---|
| 4,953,122 A | 8/1990 | Williams |
| 4,963,866 A | 10/1990 | Duncan |
| 5,068,842 A | 11/1991 | Naito |
| 5,111,444 A | 5/1992 | Fukushima et al. |
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A * | 9/1995 | Takano et al. ............... 707/205 |
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,820,962 A | 10/1998 | Kimura et al. |
| 5,848,038 A | 12/1998 | Igarashi |
| 5,867,455 A | 2/1999 | Miyamoto et al. |
| 5,878,020 A | 3/1999 | Takahashi |
| 5,914,928 A | 6/1999 | Takahashi |
| 5,920,526 A | 7/1999 | Udagawa |
| 5,982,727 A * | 11/1999 | Kondo et al. ............... 369/53.24 |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,370,096 B1 | 4/2002 | Hashimoto |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,594,725 B2 | 7/2003 | Ando et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B2 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,212,873 B1 * | 5/2007 | Townsend et al. ............... 700/94 |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 7,400,565 B2 | 7/2008 | Sasaki |
| 7,428,202 B2 | 9/2008 | Takahashi et al. |
| 7,539,114 B2 | 5/2009 | Kawakami et al. |
| 7,613,874 B2 * | 11/2009 | Park ............... 711/111 |
| 2001/0009537 A1 | 7/2001 | Park |
| 2001/0011267 A1 | 8/2001 | Kihara et al. |
| 2001/0020261 A1 | 9/2001 | Ando et al. |
| 2001/0026511 A1 | 10/2001 | Ueda et al. |
| 2001/0033517 A1 | 10/2001 | Ando et al. |
| 2001/0034855 A1 | 10/2001 | Ando et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0105868 A1 * | 8/2002 | Ko ............... 369/47.14 |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0126528 A1 | 7/2003 | Kim et al. |
| 2003/0133384 A1 * | 7/2003 | Yada et al. ............... 369/53.45 |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0042363 A1 * | 3/2004 | Kobayashi et al. ............... 369/53.21 |
| 2004/0062159 A1 | 4/2004 | Park et al. |
| 2004/0062160 A1 | 4/2004 | Park et al. |
| 2004/0067064 A1 | 4/2004 | McNicol et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0170101 A1 * | 9/2004 | Nakajo ............... 369/53.22 |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |

| | | | | | |
|---|---|---|---|---|---|
| 2004/0228238 A1* | 11/2004 | Ko et al. ............. 369/47.13 | JP | 10-187356 | 7/1998 |
| 2004/0246849 A1* | 12/2004 | Hwang et al. ............. 369/53.15 | JP | 10-187357 | 7/1998 |
| 2004/0246851 A1 | 12/2004 | Hwang et al. | JP | 10-187358 | 7/1998 |
| 2004/0246852 A1* | 12/2004 | Hwang et al. ............. 369/53.17 | JP | 10-187359 | 7/1998 |
| 2005/0007910 A1 | 1/2005 | Ito et al. | JP | 10-187360 | 7/1998 |
| 2005/0008346 A1 | 1/2005 | Noguchi et al. | JP | 10-187361 | 7/1998 |
| 2005/0025007 A1 | 2/2005 | Park | JP | 10-261286 | 9/1998 |
| 2005/0047294 A1 | 3/2005 | Park | JP | 10320924 | 12/1998 |
| 2005/0050402 A1 | 3/2005 | Koda et al. | JP | 11-039801 | 2/1999 |
| 2005/0052972 A1 | 3/2005 | Park | JP | 11-110888 | 4/1999 |
| 2005/0052973 A1 | 3/2005 | Park | JP | 11096684 | 4/1999 |
| 2005/0055500 A1 | 3/2005 | Park | JP | 11-203792 | 7/1999 |
| 2005/0060489 A1 | 3/2005 | Park | JP | 2000-090588 | 3/2000 |
| 2005/0068877 A1 | 3/2005 | Yeo | JP | 2000-149449 | 5/2000 |
| 2005/0083740 A1 | 4/2005 | Kobayashi | JP | 2000-195178 | 7/2000 |
| 2005/0083767 A1 | 4/2005 | Terada et al. | JP | 2000-215612 | 8/2000 |
| 2005/0083830 A1 | 4/2005 | Martens et al. | JP | 2000-285607 | 10/2000 |
| 2005/0162989 A1* | 7/2005 | Hwang et al. ............. 369/30.03 | JP | 2000322837 | 11/2000 |
| 2005/0195716 A1 | 9/2005 | Ko et al. | JP | 2001-023317 | 1/2001 |
| 2005/0207262 A1 | 9/2005 | Terada et al. | JP | 2001-069440 | 3/2001 |
| 2005/0289389 A1 | 12/2005 | Yamagami et al. | JP | 2001-110168 | 4/2001 |
| 2006/0077827 A1 | 4/2006 | Takahashi | JP | 2001-351334 | 12/2001 |
| 2006/0077872 A1 | 4/2006 | Hwang et al. | JP | 2001-357623 | 12/2001 |
| 2006/0195719 A1 | 8/2006 | Ueda et al. | JP | 2002-015507 | 1/2002 |
| 2006/0203635 A1 | 9/2006 | Ko et al. | JP | 2002-015525 | 1/2002 |
| 2006/0203638 A1 | 9/2006 | Ko et al. | JP | 2002-050131 | 2/2002 |
| 2006/0203684 A1 | 9/2006 | Ko et al. | JP | 2002-056619 | 2/2002 |
| 2006/0227694 A1 | 10/2006 | Woerlee et al. | JP | 2002-056631 | 2/2002 |
| 2007/0294571 A1 | 12/2007 | Park et al. | JP | 2002-215612 | 8/2002 |
| 2008/0046780 A1 | 2/2008 | Shibuya et al. | JP | 2002-245723 | 8/2002 |
| | | | JP | 2002-288938 | 10/2002 |
| FOREIGN PATENT DOCUMENTS | | | JP | 2002-329321 | 11/2002 |
| CN | 1140897 | 1/1997 | JP | 2002-352522 | 12/2002 |
| CN | 1227950 | 9/1999 | JP | 2004-171714 | 6/2004 |
| CN | 1273419 | 11/2000 | JP | 2004-280864 | 10/2004 |
| CN | 1304533 | 7/2001 | JP | 2004-280865 | 10/2004 |
| CN | 1404057 | 3/2003 | JP | 2004-303381 | 10/2004 |
| CN | 1675708 | 9/2005 | JP | 2005-004912 | 1/2005 |
| CN | 1685426 A | 10/2005 | JP | 2006-503396 | 1/2006 |
| DE | 199 54 054 | 6/2000 | JP | 2006-085859 | 3/2006 |
| EP | 0 314 186 | 5/1989 | JP | 2008511095 | 4/2008 |
| EP | 0 325 823 | 8/1989 | KR | 10-2004-0094301 | 11/2004 |
| EP | 0 350 920 | 1/1990 | KR | 2005-0109895 | 11/2005 |
| EP | 0 428 208 A2 | 5/1991 | RU | 2174716 | 10/2001 |
| EP | 0 464 811 | 1/1992 | TW | 371752 | 10/1999 |
| EP | 0 472 484 | 2/1992 | TW | 413805 | 12/2000 |
| EP | 0 477 503 | 4/1992 | TW | 452770 | 9/2001 |
| EP | 0 556 046 | 8/1993 | TW | 509890 | 11/2002 |
| EP | 0 871 172 | 10/1998 | TW | 518573 | 1/2003 |
| EP | 0 908 882 A2 | 4/1999 | TW | 200401275 | 1/2004 |
| EP | 0 974 967 | 1/2000 | TW | 200402045 | 2/2004 |
| EP | 0 989 554 | 3/2000 | TW | 200403663 | 3/2004 |
| EP | 0 997 904 | 5/2000 | WO | WO 84/00628 | 2/1984 |
| EP | 1 026 681 | 8/2000 | WO | WO 96/27882 | 9/1996 |
| EP | 1 043 723 | 10/2000 | WO | WO 96/30902 | 10/1996 |
| EP | 1 132 914 | 9/2001 | WO | WO 97/22182 | 6/1997 |
| EP | 1 148 493 | 10/2001 | WO | WO 00/54274 | 9/2000 |
| EP | 1 152 414 | 11/2001 | WO | WO 01/22416 | 3/2001 |
| EP | 1 239 478 | 9/2002 | WO | WO 01/93035 | 12/2001 |
| EP | 1 274 081 | 1/2003 | WO | WO 03/007296 | 1/2003 |
| EP | 1 298 659 | 4/2003 | WO | WO 03/025924 | 3/2003 |
| EP | 1 329 888 | 7/2003 | WO | WO 03/079353 | 9/2003 |
| EP | 1 347 452 | 9/2003 | WO | WO 2004/015707 | 2/2004 |
| EP | 1 564 740 | 8/2005 | WO | WO 2004/015708 | 2/2004 |
| EP | 1 612 790 A1 | 1/2006 | WO | WO 2004/025648 | 3/2004 |
| EP | 1 760 716 | 3/2007 | WO | WO 2004/025649 | 3/2004 |
| GB | 2 356 735 | 5/2001 | WO | WO 2004/029668 | 4/2004 |
| JP | 63-091842 | 4/1988 | WO | WO 2004/029941 | 4/2004 |
| JP | 01-263955 | 10/1989 | WO | WO 2004/029968 A2 | 4/2004 |
| JP | 02-023417 | 1/1990 | WO | WO 2004/034396 | 4/2004 |
| JP | 5-46456 | 2/1993 | WO | WO 2004/036561 | 4/2004 |
| JP | 05-274814 | 10/1993 | WO | WO 2004/049332 | 6/2004 |
| JP | 06-338139 | 12/1994 | WO | WO 2004/053872 | 6/2004 |
| JP | 06-349201 | 12/1994 | WO | WO 2004/053874 | 6/2004 |
| JP | 08-096522 | 4/1996 | WO | WO 2004/068476 | 8/2004 |
| JP | 09-145634 | 6/1997 | WO | WO 2004/075180 | 9/2004 |
| JP | 09-231053 | 9/1997 | WO | WO 2004/079631 | 9/2004 |
| JP | 10-050005 | 2/1998 | WO | WO 2004/079731 A1 | 9/2004 |
| JP | 10-050032 | 2/1998 | WO | WO 2004/079740 | 9/2004 |

| | | |
|---|---|---|
| WO | WO 2004/081926 | 9/2004 |
| WO | WO 2004/086379 A1 | 10/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 A2 | 1/2005 |
| WO | WO 2005/124768 | 12/2005 |
| WO | WO 2006/011721 | 2/2006 |

OTHER PUBLICATIONS

The International Search Report issued Nov. 17, 2004 in International Patent Application No. PCT/KR2004/001653.

Office Action issued Feb. 4, 2009 by the U.S. Patent and Trademark Office in counterpart U.S. Appl. No. 11/249,710.

"JIS Handbook Data Processing for Hardware," Japanese Standards Association Inc., Japan, Apr. 21, 1999, pp. 1064-1070.

Office Action issued Jun. 18, 2008 by the U.S. Patent and Trademark Office in counterpart U.S. Appl. No. 10/840,264.

Office Action issued Jun. 13, 2008 by the U.S. Patent and Trademark Office in counterpart U.S. Appl. No. 10/841,516.

Office Action issued Jun. 11, 2008 by the U.S. Patent and Trademark Office in counterpart U.S. Appl. No. 11/797,971.

Search Report issued Jun. 5, 2008 by the European Patent Office in corresponding European Patent Application No. 07110035.8-1247.

Office Action issued Jun. 26, 2008 by the Russian Patent Office in corresponding Russian Patent Application No. 2006104619/28(005004).

Office Action issued Jun. 24, 2008 by the U.S. Patent and Trademark Office in corresponding U.S. Appl. No. 11/147,198.

Office Action issued Jul. 7, 2008 by the U.S. Patent and Trademark Office in corresponding U.S. Appl. No. 10/781,828.

Office Action issued Jul. 25, 2008 by the U.S. Patent and Trademark Office in corresponding U.S. Appl. No. 11/158,358.

Office Action issued Jul. 30, 2008 by the U.S. Patent and Trademark Office in corresponding U.S. Appl. No. 10/670,274.

T. Yokozeki et al., "A Virtual Optical Disk Method to Realize Rewritability and Revision Control on a Write-Once Optical Disk", Systems & Computers in Japan, vol. 21, No. 8, pp. 34-43, Jan. 1, 1990.

Supplementary Search Report issued Jan. 21, 2009 by the European Patent Office in European Patent Application No. 04748387.0-2223.

Office Action issued Apr. 3, 2009 by the Japanese Patent Office in counterpart Japanese Patent Application No. 2007-517955.

Search Report issued Jul. 1, 2009 by the European Patent Office in counterpart European Patent Application No. 09159176.8-2223.

Office Action issued Jul. 10, 2009 by the Japanese Patent Office in counterpart Japanese Patent Application No. 2007-057630 (with English language translation).

U.S. Notice of Allowance dated Mar. 5, 2010 for corresponding U.S. Appl. No. 11/711,019.

Japanese Office Action dated Feb. 16, 2010 for corresponding Application No. 2006-518543.

Japanese Office Action dated Dec. 11, 2009 for corresponding Application No. 2007-057630.

Russian Notice of Allowance dated Dec. 24, 2009 for corresponding Application No. 2006145868.

Japanese Office Action dated Dec. 25, 2009 for corresponding Application No. 2007-517955.

Office Action for corresponding Japanese Patent Application No. 2005-502377 dated Jul. 6, 2010.

Patent Gazette for corresponding Chinese Patent Application No. 200580035267.3 dated Jul. 21, 2010.

Taiwan Office Action dated Dec. 2, 2010 issued in corresponding Taiwan Application No. 96109993 and English translation thereof.

Japanese Office Action dated Feb. 4, 2011 issued in corresponding Japanese Application No. 2007-536613.

Canadian Office Action dated Feb. 4, 2011 issued in corresponding Canadian Application No. 2,557,449.

Taiwan Office Action dated Dec. 2, 2010 issued in corresponding Taiwan Application No. 94121046 and English translation thereof.

Japanese Office Action dated Dec. 21, 2010 issued in corresponding Japanese Application No. 2009-278802.

Korean Notice of Allowance dated Jul. 28, 2011 issued in corresponding Korean Application No. 10-2006-7019754.

* cited by examiner

FIG. 7

TDDS

| |
|---|
| TDDS identifier = "TDS" |
| TDDS update counter |
| ⋮ |
| Location LSN=0 of User Data Area |
| Location (new) Last LSN of User Data Area |
| ⋮ |

FIG. 8

TDDS

| |
|---|
| TDDS identifier = "TDS" |
| TDDS update counter |
| ⋮ |
| Location LSN=0 of User Data Area |
| Location Last LSN of User Data Area |
| Location Last LSN of usable User Data Area |
| ⋮ |

Sequential Recording Mode (SRM)

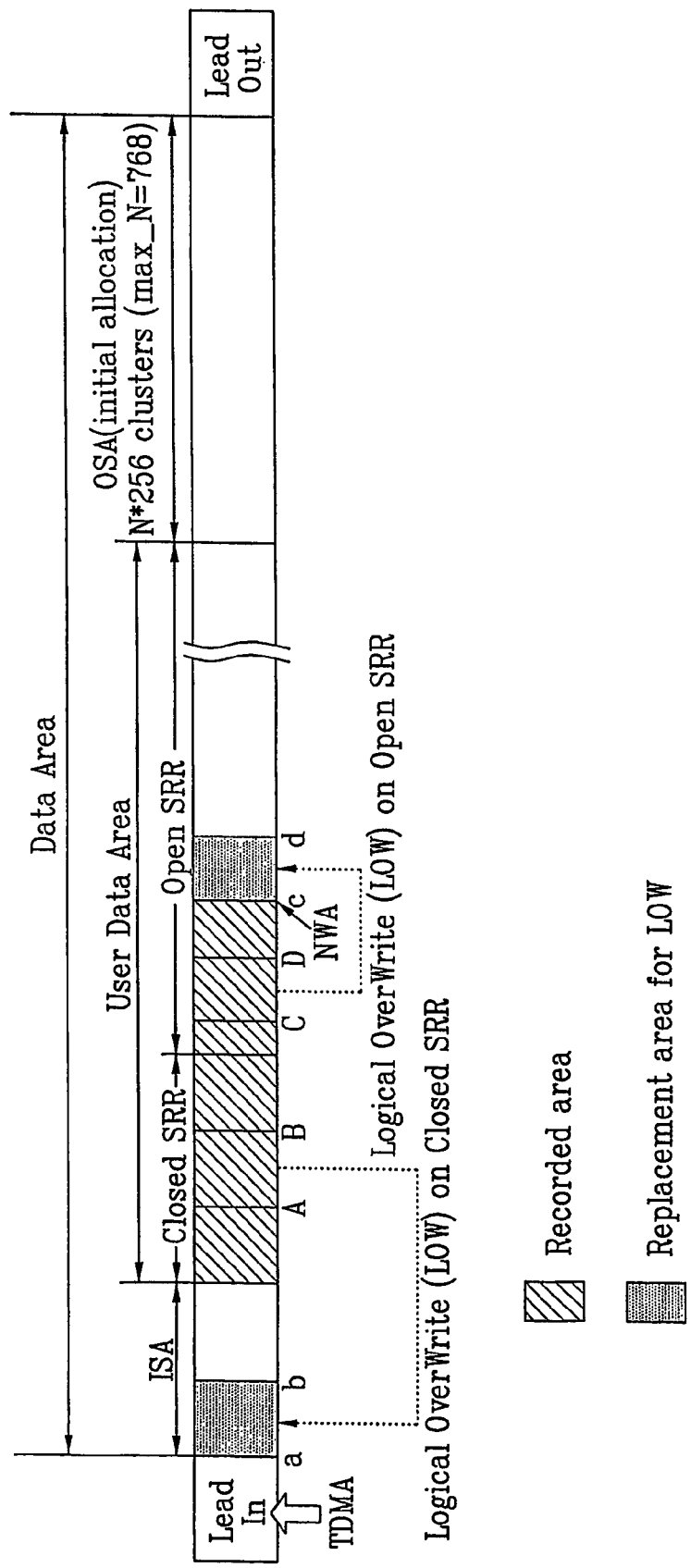

METHOD AND APPARATUS FOR MANAGING A OVERWRITE RECORDING ON OPTICAL DISC WRITE ONCE

PRIORITY INFORMATION

This U.S. National Phase application claims benefit of priority under 35 U.S.C. §119 of Korean Patent Application No. 10-2003-0045316 filed Jul. 4, 2003, the entire contents of which are incorporated herein by reference.

TECHNICAL FIELD

The present invention relates to an overwrite method of a write-once optical disc and apparatus thereof, by which an overwrite is logically enabled.

BACKGROUND ART

Recently, a high-density optical record medium such as BD-RE (rewritable Blu-ray disc) enabling to record and store massive high-definition video data and high-quality audio data is expected to be developed and marketed.

The BD-RE, as shown in FIG. 1, is divided into a lead-in area, a data area, and a lead-out area. And, an inner spare area (ISA) and an outer spare area (OSA) are allocated to a front head and a rear end of the data area, respectively.

In the BD-RE, data is recorded by cluster unit as a predetermined record unit. Owing to the features of a rewritable disc, data can be repeatedly written in a specific area of the disc, which is called 'physical overwrite'. In the course of writing data, it is detected whether a defective area or cluster, as shown in FIG. 1, exists within the data area.

If the defective area is detected, a replacement write operation of recording the data written in the defective area in a spare area, e.g., inner spare area (ISA), is performed as well as management information including location information of the defective area and location information of the replaced data in the spare area is recorded in a defect list in a defect management area (DMA) within the lead-in area.

Meanwhile, standardization for BD-WO (Blu-ray disc write-once) is being discussed. As data can be written in an entire area of a write-once optical disc once only, the physical overwrite is impossible for the write-once optical disc.

However, in order to edit recorded data in the write-once optical disc, to amend a corresponding portion of the recorded data, or to provide user's or host's convenience, the overwrite may be needed. Hence, an effective system enabling the overwrite for the write-once optical disc is urgently needed.

DISCLOSURE OF THE INVENTION

Accordingly, the present invention is directed to an overwrite method of a write-once optical disc and apparatus thereof that substantially obviate one or more of the problems due to limitations and disadvantages of the related art.

An object of the present invention is to provide an overwrite method of a write-once optical disc and apparatus thereof, by which a logical overwrite is enabled in the write-once optical disc.

Another object of the present invention is to provide an overwrite method of a write-once optical disc and apparatus thereof, by which continuity of a data area is maintained after completion of a logical overwrite.

A further object of the present invention is to provide an overwrite method of a write-once optical disc and apparatus thereof, by which a logical overwrite system different according to a recording mode or optimal to the recording mode can be provided.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an overwrite method of an optical disc according to the present invention includes the step of performing a replacement recording on a data area within the optical disc with overwrite-requested data in a specific recording-completed area within the optical disc in a sequential recording mode (SRM) wherein a logical overwrite is executed to maintain continuity of a user data area by the replacement recording.

To further achieve these and other advantages and in accordance with the purpose of the present invention, an overwrite method of an optical disc includes the step of performing a replacement recording on a spare area within the optical disc with overwrite-requested data in a specific recording-completed area within the optical disc in a random recording mode (RRM) wherein a size of the spare area for allocation is determined on disc initialization for the replacement recording.

To further achieve these and other advantages and in accordance with the purpose of the present invention, in performing a recording on a write-once optical disc in a recording mode selected from the group consisting of a sequential recording mode (SRM) and a random recording mode (RRM), a write-once optical disc overwriting method includes the steps of determining a replacement recording area for an overwrite according to the recording mode if the overwrite on a user data area within the optical disc is requested and executing a logical overwrite.

To further achieve these and other advantages and in accordance with the purpose of the present invention, a recording/reproducing apparatus for a write-once optical disc includes a control unit delivering a recording command requesting a recording execution on a specific area and a recording/reproducing unit deciding whether the specific area is a recording-completed area or a non-recorded area, the recording/reproducing unit performing a replacement recording on another area within a data area if the specific area is the recording-completed area, the recording/reproducing unit executing the replacement recording by differentiating the replacement-recorded area according to a disc recording mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 and FIG. 8 are diagrams of management information interoperating with an overwrite method of a write-once optical disc according to the present invention;

FIG. 9A and FIG. 9B are structural diagrams for an overwrite method of a write-once optical disc applicable to sequential recording mode (SRM) according to another embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Although terms used in the following description may have meanings in the art, some terms are arbitrarily chosen by the applicant and their meanings are explained in detail in the following description. Hence, the present invention should be understood with the intended meanings of the corresponding terms chosen by the applicant instead of the simple names or meanings of the terms themselves.

The present invention is characterized in enabling an overwrite system in a write-once optical disc. An overwrite system generally means a 'physical overwrite' when recording data on a specific area of a rewritable optical disc repeatedly. Hence, the physical overwrite means a unique feature of a rewritable optical disc but fails to be applicable to a write-once optical disc.

Yet, the present invention enables an overwrite logically as well as maintains the 'write-once' feature of the write-once optical disc. Specifically, the present invention maintains the continuity of a user data area after completion of the logical overwrite and enhances efficiency of a disc use by applying a logical overwrite system differently according to a recording mode of a write-once optical disc.

Various embodiments representing objects and characteristics of the present invention are explained in detail as follows. For convenience of explanation, BD-WO is taken as an example.

Figure 1:
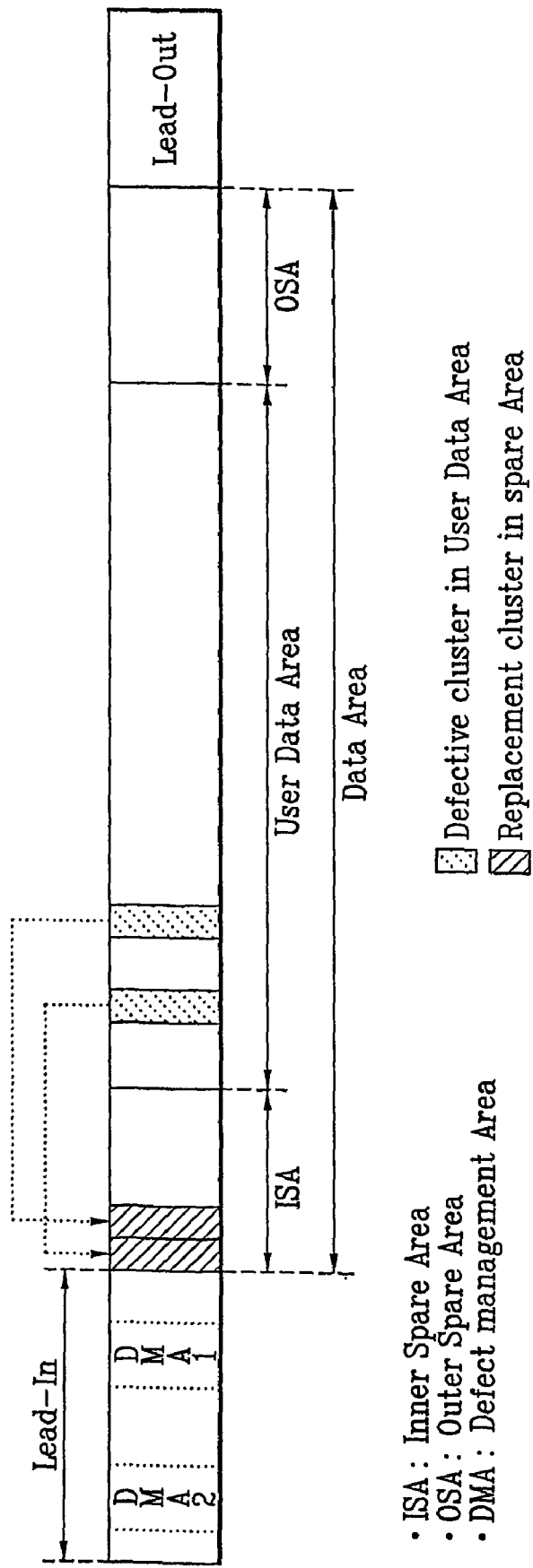
FIG. 1 is a structural diagram of BD-RE.
Figure 2:
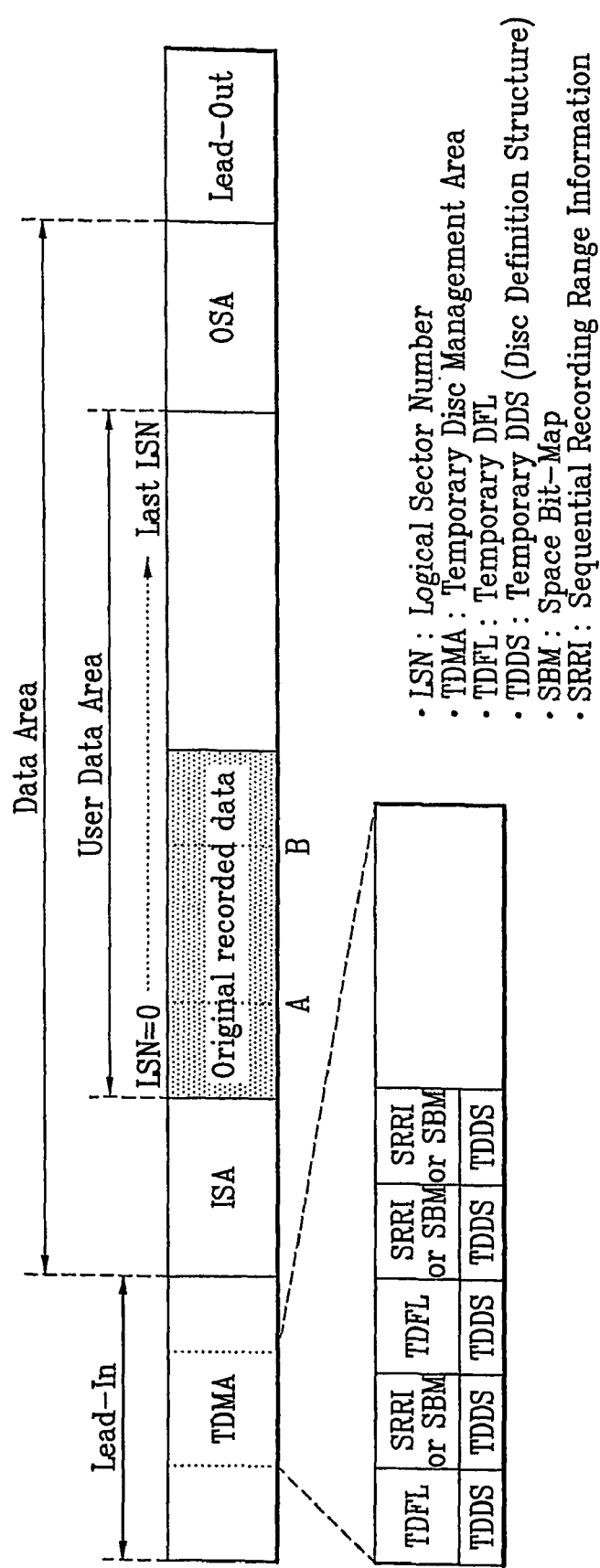
FIG. 2 is a structural diagram of a write-once optical disc according to the present invention.

FIG. 2 is a schematic structural diagram of a write-once optical disc according to the present invention.

Referring to FIG. 2, a write-once optical disc according to the present invention is divided into a lead-in area, a data area, and a lead-out area. An inner spare area (ISA) and an outer spare area (OSA) are allocated to a front portion and a rear portion of the data area, respectively. Moreover, a user data area is allocated in the middle of the data area.

LSN (logical sector number) is given to the user data area. A user or host refers to the LSN to deliver a recording command. A recording/reproducing unit ('10' in FIG. 11) having received the recording command converts the LSN to PSN (physical sector number) substantially indicating location information within a disc to perform the recording command.

A temporary disc management area (TDMA) for recording disc management information therein is provided to the disc. TDFL (temporary defect list), TDDS (temporary disc definition structure), SBM (space bitmap), SRRI (sequential recording range information), and the like are recorded as the management information within the TDMA.

In recording the management information after completion of a replacement recording for an overwrite, the present invention intends to record location information of a replacement-recorded area and location information of a defective area within TDFL and to record LSN (logical sector number) information representing continuity of a user data area within TDDS after completion of the replacement recording.

SBM or SRRI information recorded within TDMA is optionally recorded according to a recording mode. For instance, if the recording mode is SRM (sequential recording mode), SRRI is recorded. If the recording mode is RRM (random recording mode), SBM is recorded. Specifically, the recording mode is determined in disc initialization. The once-determined recording mode becomes invariable thereafter.

In the meaning of the SBM (space bitmap), '1b' is written in the SBM if a corresponding cluster is recorded by allocating one 1-bit to each 1-cluster as a minimum recording unit. '0b' is written in the SBM if not. Hence, by reading the SBM information, it can be easily known where a recorded or non-recorded area of the current disc is located. Namely, a recording/reproducing apparatus may determine a recording-completed state or non-recorded state of the corresponding area via the SBM information when receiving a recording command for performing a recording on a specific area from a user. In case of a recording-completed area, a replacement recording is performed on another area within the data area to enable the logical overwrite of the present invention.

The meaning of the SRRI (sequential recording range information) is explained as follows. First of all, in performing a recording on the user data area within the disc sequentially, a SRR (sequential recording range) is preferentially allocated to an area identified as a writable area to perform the recording on the corresponding SRR. If an additional writable SRR is named 'open SRR' and an SRR on which recording is to be performed no more is named 'closed SRR', the SRRI indicates the information of the locations of the open and closed SRRs existing within the disc and the information of the allocation state of the SRR.

The management information recorded in TDMA such as TDFL, TDDS, SBM, and SRRI are each updated by minimum 1-cluster units, each with specific update timing. The write-once optical disc should be provided with an area for recording the management information such as TDMA (temporary disc management area).

Where the recording-completed area exists within the data area in FIG. 2, the physical overwrite is not available for the corresponding area due to the characteristics of the write-once optical disc. Yet, if a recording command from a user or host requests to perform a recording on the A-B area (recording-completed area) as shown in FIG. 2, the present invention is characterized in that the recording/reproducing unit ('10' in FIG. 11) itself performs the replacement recording on another area within the data area.

Hence, the user or host is enabled to issue the recording command regardless of the recording completion on the specific area within the disc. This means that the overwrite can be performed on the write-once optical disc like a rewritable optical disc. Specifically, such an overwrite is called 'logical overwrite (LOW)' to be distinguished from 'physical overwrite'.

In performing the recording command on the A-B area on which the recording was physically completed already, it is unable to perform the overwrite on the corresponding area. Yet, the present invention performs the replacement recording on a location securing the continuity of the user data area and records its management information in the TDMA within the disc to complete the recording command.

Figure 3A:
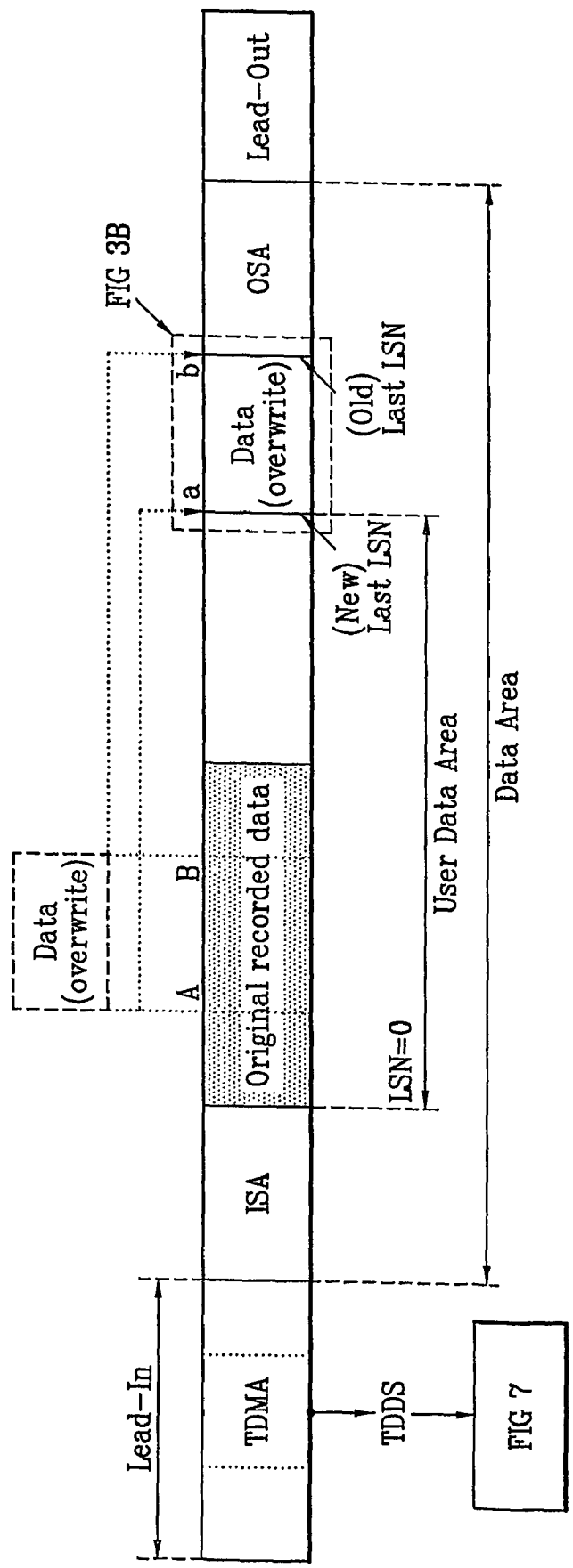
FIG. 3A and FIG. 3B are structural diagrams for an overwrite method of a write-once optical disc according to one embodiment of the present invention.

FIG. 3A is a structural diagram for an overwrite method of a write-once optical disc according to one embodiment of the present invention.

Referring to FIG. 3A, in performing a replacement recording on another area within a data area instead of a overwrite-requested area (A-B area), the replacement recording is performed on an a-b area including a portion of OSA (outer spare area) and a last writable location of the user data area is changed after completion of the replacement recording in order to maintain the continuity of the user data area after completion of the replacement recording.

Namely, prior to the replacement recording, the user data area had Last LSN information (old) corresponding to a location right before OSA. Yet, after completion of the replacement recording, a new Last LSN is given. Thus, a user or host issues a recording command by taking the LSN as a reference, whereby the replacement-completed area is excluded from the LSN to enable to maintain the overall continuity of the user data area. This finally provides convenience to the operation of a recording/reproducing unit ('10' in FIG. 11) in performing the recording within the disc.

Figure 3B:
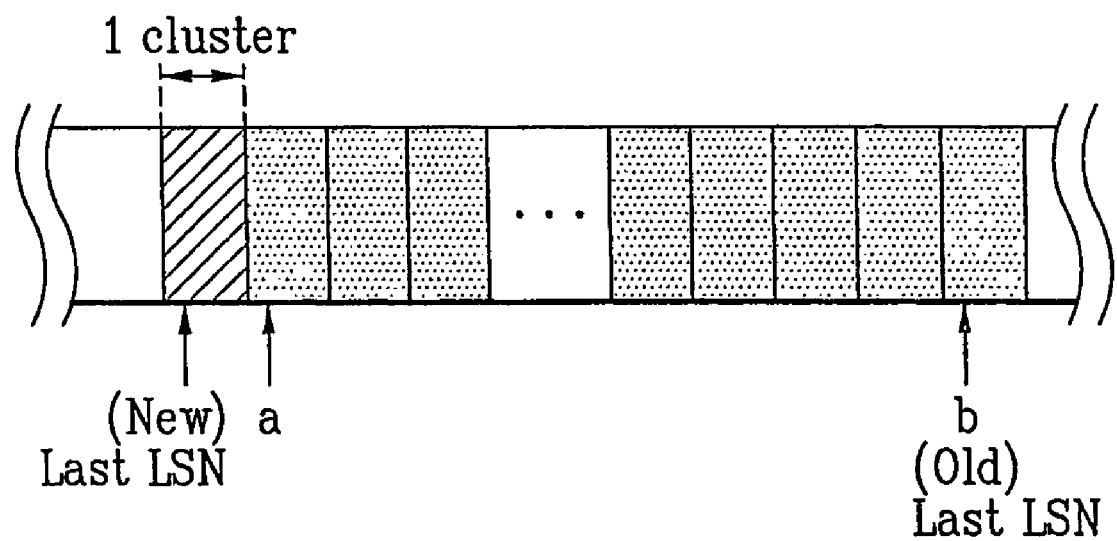

FIG. 3B is a magnified diagram of the replacement-recorded area (a-b area) in FIG. 3A.

Referring to FIG. 3B, a prior LSN (old Last LSN) location is utilized in a replacement recording. After completion of the replacement recording, a Last LSN of a usable user data area is given to an area right before a location 'a' enabling to be utilized from a new Last LSN in a next overwrite.

Information according to the Last LSN change after the replacement recording should be recorded in a predetermined location of a management area within a disc. For the predetermined location, the present invention uses the TDDS within TDMA, in one example. A plurality of general disc management informations are included within TDDS that is updated with the latest information. Hence, the TDDS is optimal to record the management information of the present invention. In the system shown in FIG. 3A and FIG. 3B, a specific method of recording the newly changed LSN information will be later explained in detail by referring to FIG. 7.

Figure 4:
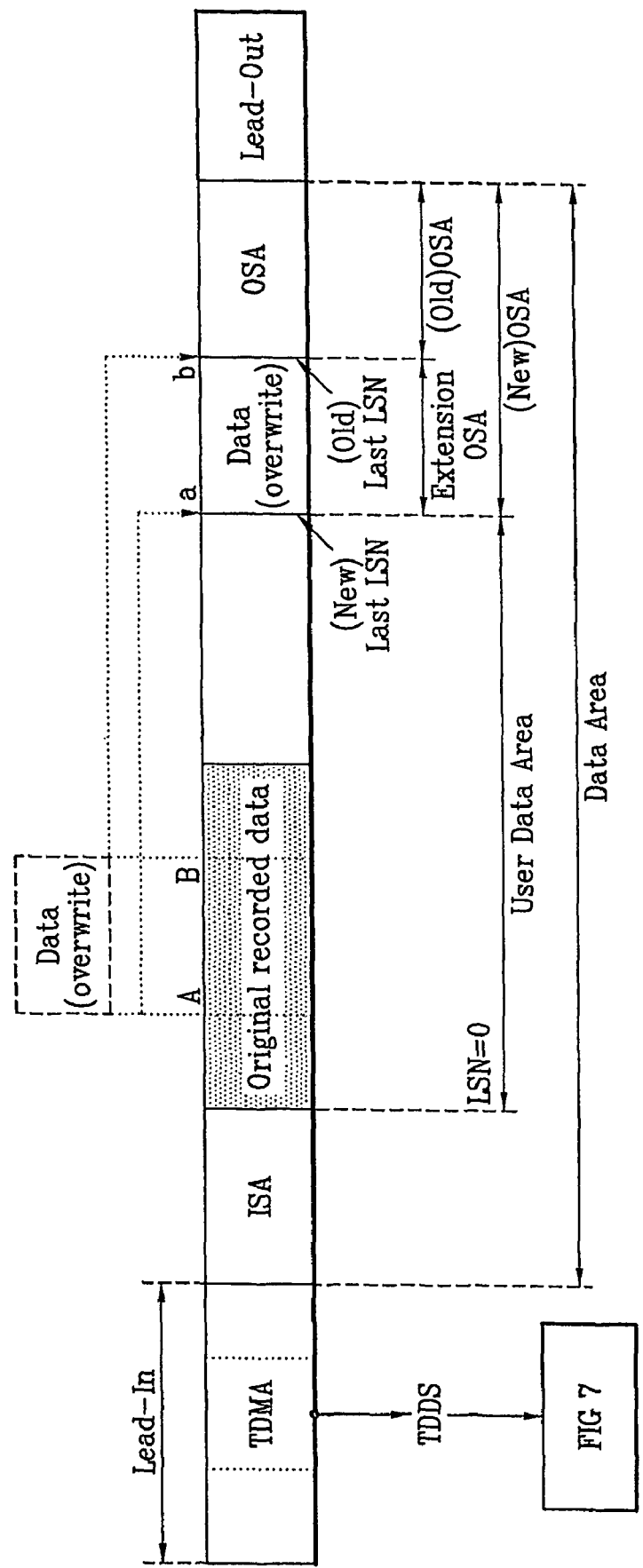
FIG. 4 and FIG. 5 are structural diagrams for an overwrite method of a write-once optical disc according to another embodiments of the present invention, respectively.

FIG. 4 graphically shows a structural diagram for an overwrite method of a write-once optical disc according to another embodiments of the present invention.

Referring to FIG. 4, in performing a replacement recording on another area within a data area instead of an overwrite-requested area (A-B area), in order to maintain the continuity of the user data area after completion of the replacement recording, the replacement recording is performed on an a-b area including a portion of OSA (outer spare area), the OSA is extended to a replacement-recorded size after completion of the replacement recording, and a last writable location information of the user data area changed by the extended OSA is changed to be recorded as management information. The newly changed LSN information will be recorded in TDDS within TDMA, which will be later explained in detail by referring to FIG. 7.

Figure 5:
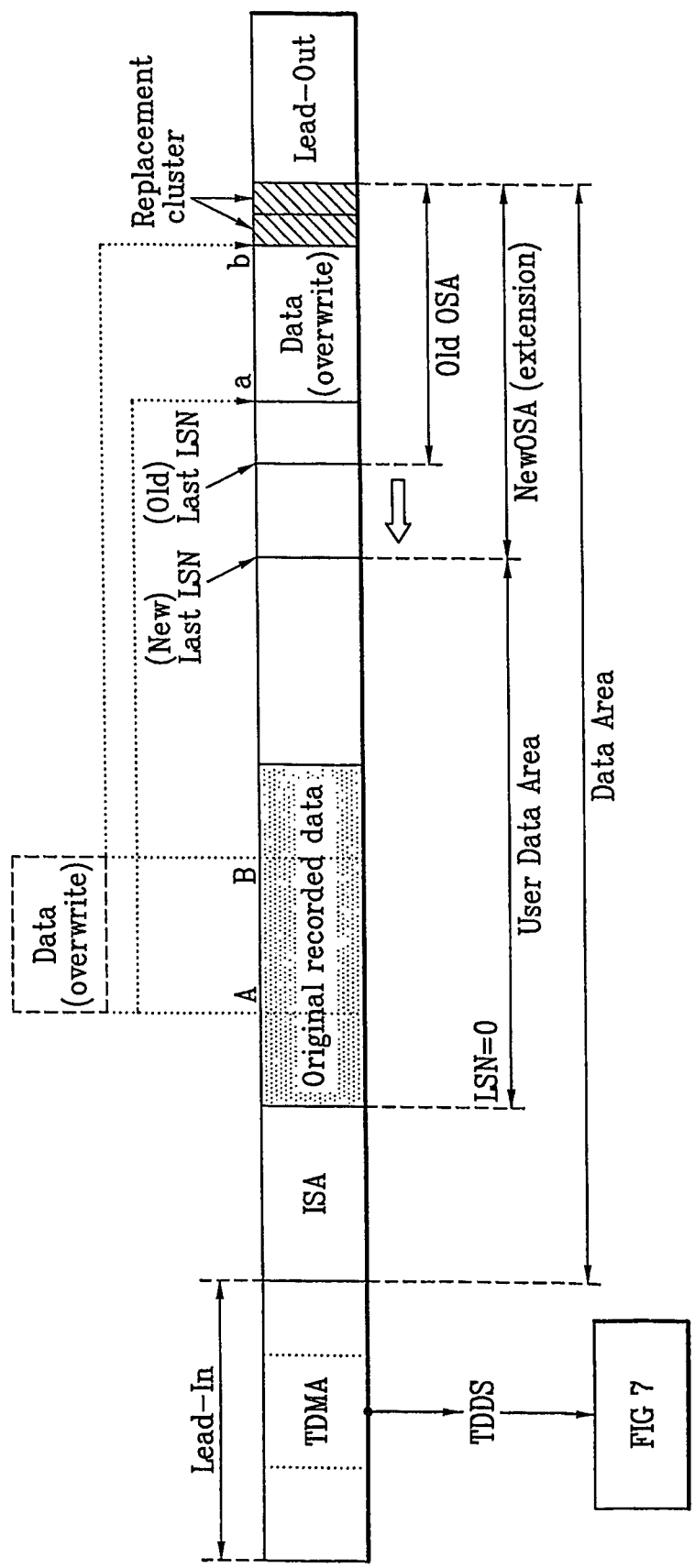

FIG. 5 graphically shows a structural diagram for an overwrite method of a write-once optical disc according to another embodiment of the present invention.

Referring to FIG. 5, in performing a replacement recording on another area within a data area instead of an overwrite-requested area (A-B area), in order to maintain the continuity of the user data area after completion of the replacement recording, the replacement recording is performed on OSA, the OSA is extended by considering a replacement-recorded area size, and a last writable location information of the user data area changed by the extended OSA is changed if the OSA is extended. Hence, the OSA area may not be extended by considering the replacement-recorded area size after completion of the replacement recording. If the OSA is not extended, a last writable location information of the user data area may not be changed. A time point of OSA extension can be that of initialization or may be determined by a user's request during operation of the disc. An overwrite performing method in case of allocating OSA by extending a size of the OSA will be explained in detail by referring to FIGS. 9A to 10 later.

Moreover, the newly changed LSN information will be recorded in TDDS within TDMA, which is be explained in detail by referring to FIG. 7 as follows.

FIG. 7 shows a TDDS structure according to the embodiments of the present invention in FIG. 3A, FIG. 4, and FIG. 5 when changed LSN information is recorded in TDDS in case of performing a replacement recording according to an overwrite request.

Referring to FIG. 7, a field for recording 'LSN=0' location information (Location LSN=0 of User Data Area) and a field for recording 'Last LSN' location information (Location (new) Last LSN of User Data Area) are provided within TDDS. Hence, whenever TDDS is updated, the 'LSN=0' location information and 'Last LSN' information at the time point of update are recorded.

In accordance with the embodiments in FIG. 3A, FIG. 4, and FIG. 5, the replacement recording is performed by the overwrite request and the Last LSN information changed by the replacement recording is recorded in the corresponding field within the TDDS. Hence, it is able to confirm an accurate location of Last LSN thereafter.

Figure 6:
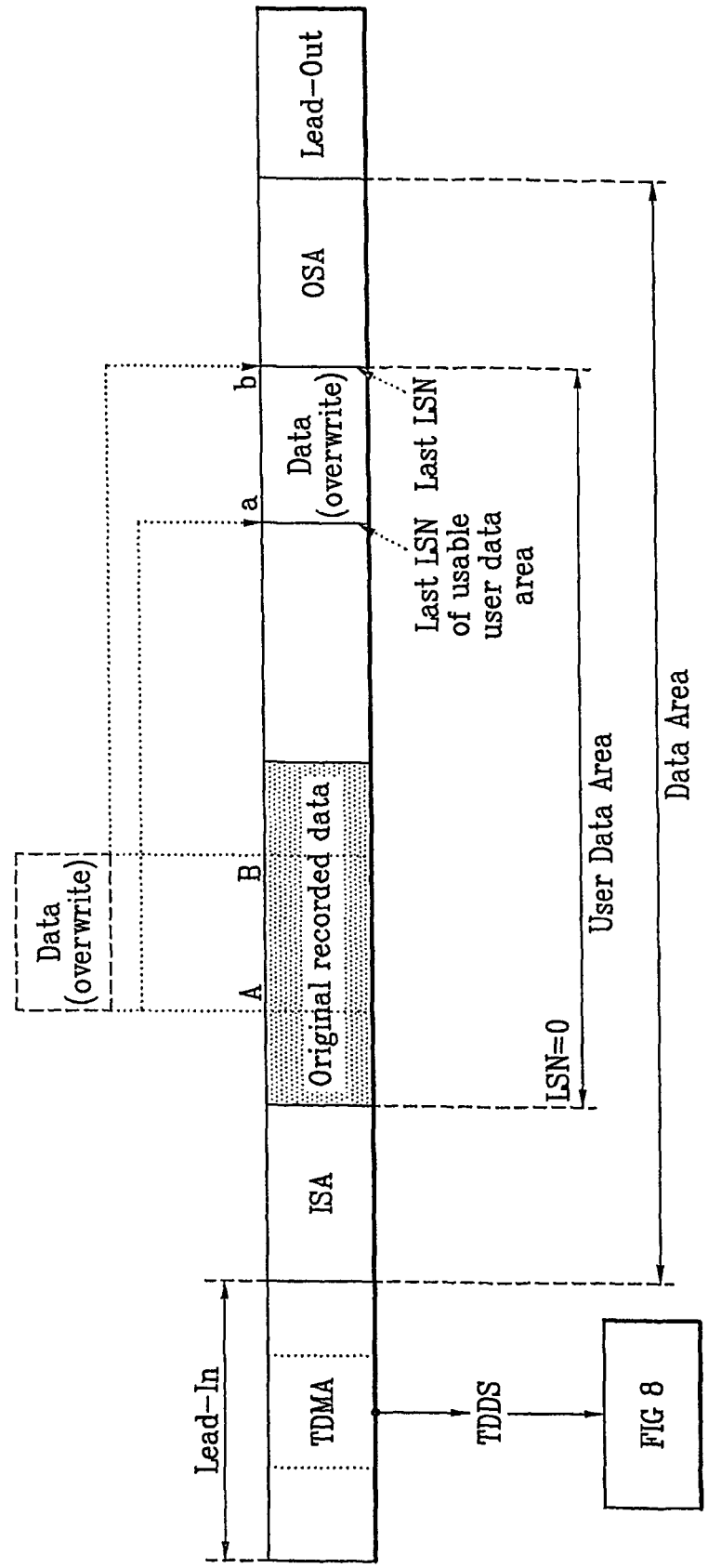
FIG. 6 is a structural diagram for an overwrite method of a write-once optical disc according to another embodiment of the present invention.

FIG. 6 graphically shows a structural diagram for an overwrite method of a write-once optical disc according to another embodiment of the present invention.

Referring to FIG. 6, in performing a replacement recording on another area within a data area instead of an overwrite-requested area (A-B area), in order to maintain the continuity of the user data area after completion of the replacement recording, the replacement recording is performed on an a-b area including a portion of OSA (outer spare area) and a last writable location of the user data area is changed after completion of the replacement recording.

Specifically, the embodiment in FIG. 6 differs from the embodiments in FIG. 3A, FIG. 4, or FIG. 5 in that the new Last LSN is given after the replacement recording by maintaining the Last LSN value (before OSA) given to the user data area prior to the replacement recording as it is. This is named 'Last LSN of usable user data area'.

FIG. 8 shows management information recorded within TDDS in the case of FIG. 6, in which both of the prior 'Last LSN' and the 'usable Last LSN' changed after the replacement recording are included.

Referring to FIG. 8, a field for recording 'LSN=0' location information (Location LSN=0 of User Data Area), a field for recording 'Last LSN' location information (Location (new) Last LSN of User Data Area), and another field for 'Last LSN' location information (Location Last LSN of usable User Data Area) are provided within TDDS.

Figure 9A:
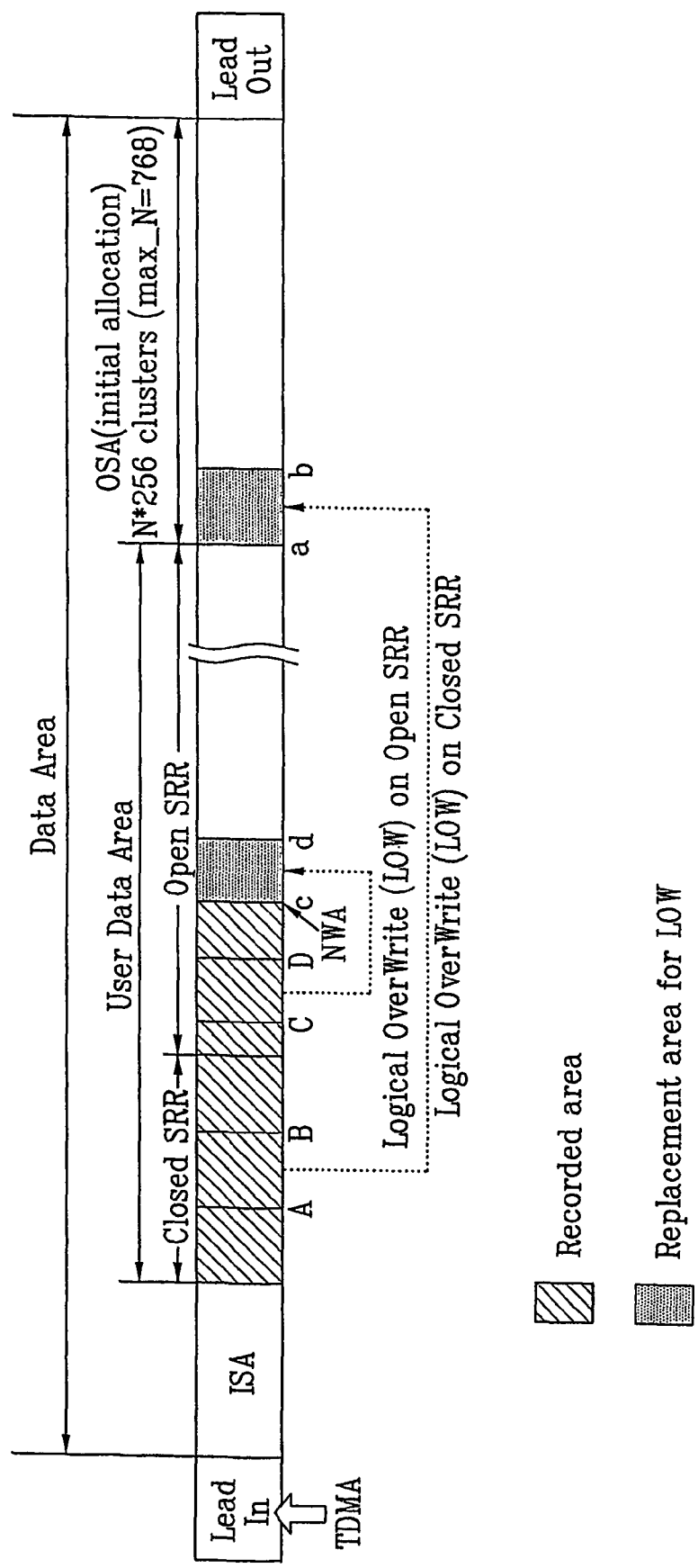
Figure 10:
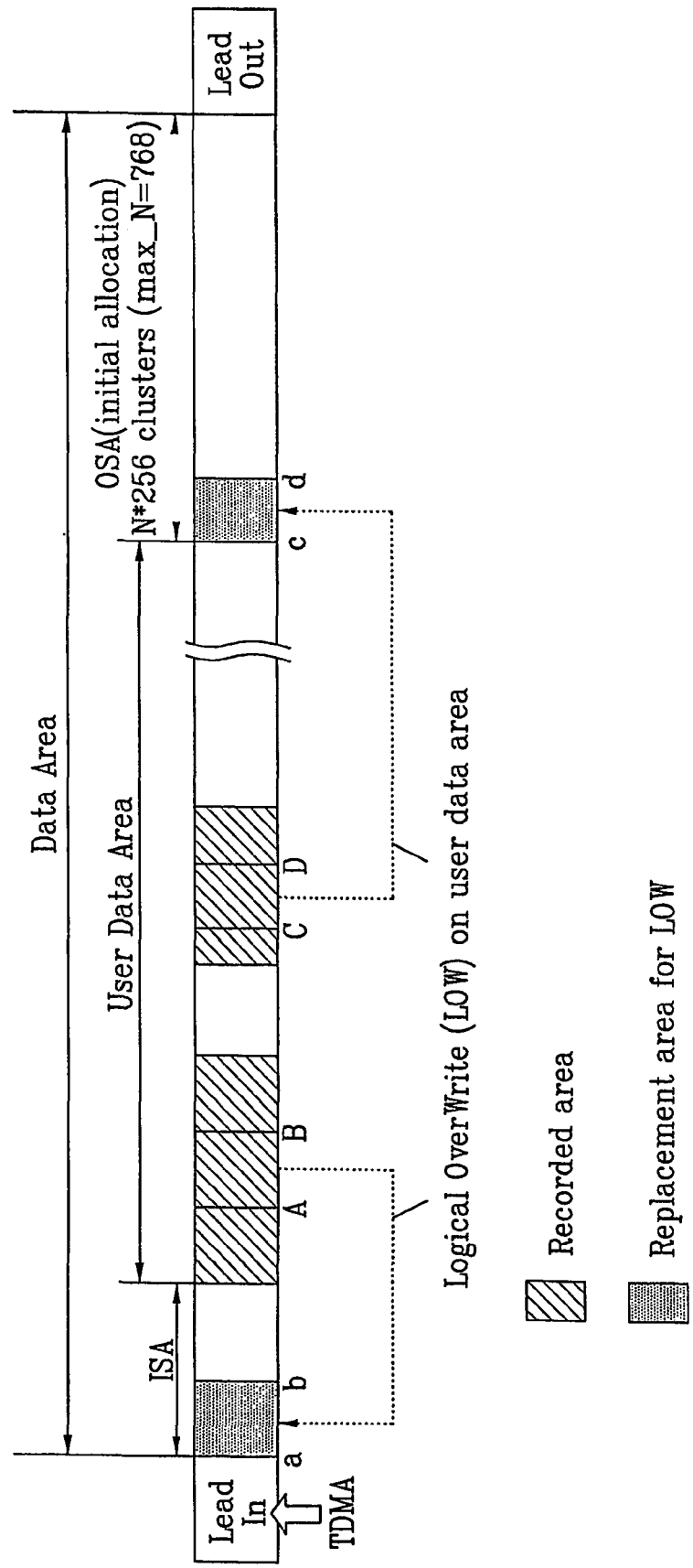
FIG. 10 is a structural diagram for an overwrite method of a write-once optical disc applicable to random recording mode (RRM) according to another embodiment of the present invention.

FIGS. 9A to 10 are structural diagrams for an overwrite method of a write-once optical disc according to additional embodiments of the present invention, in which a logical overwrite is performed on an optical disc according to a recording mode by securing data continuity.

FIG. 9A and FIG. 9B are structural diagrams for a method of performing a LOW (logical overwrite) in a sequential recording mode (SRM) according to another embodiments of the present invention. The sequential recording mode (hereinafter abbreviated SRM) is explained as follows.

First of all, in recording data in a write-once optical disc, a specific recording area is sequentially allocated from an inner circumference of a user data area. This is called SRR (sequential recording range). The SRR is categorized into two types. A first type is an 'open SRR' that is writable within a corresponding SRR. And, a second type is 'closed SRR' where it is impossible to record data within a corresponding SRR. Specifically, 'open SRR' has information indicating a location of a last located area (LRA) within the corresponding SRR, meaning a writable area from a first cluster after the LRA, and is called 'NWA' (next writable area). Namely, the open SRR means an SRR having the NWA and the closed SRR means an SRR failing to have the NWA. Various information for the SRR is provided to a recording/reproducing unit ('10' in FIG. 11) in the form of the SRRI recorded within TDMA as mentioned in FIG. 2.

For the LOW execution, the present invention allocates a sufficient size to an initial spare area allocation. Namely, OSA is allocated with as many as N*256 clusters. And, a system is enabled to allocate an OSA size within a maximum N=768 ('max_N=768'). One cluster is constructed with 32-sectors. And, one sector consists of 2 kbytes. If OSA is allocated by a maximum N=768, the OSA size becomes about 12 Gbytes amounting to 50% of the entire data area. Namely, a maximum 50% of the data area is allocated to the OSA size, thereby preventing a problem in future LOW executions.

A method of executing a LOW is differentiated according to the SRR type. Namely, if there is an overwrite (LOW) request of data to a recorded area, e.g., C-D area, within the open SRR, the recording/reproducing unit ('10' in FIG. 11) records the data in a replacement area for LOW, e.g., c-d area, from an NWA location existing within the corresponding SRR.

In case of the closed SRR, NWA fails to exist within a corresponding SRR. Hence, the closed SRR means an area where it is impossible to perform a recording thereon any more. If there is an overwrite (LOW) request of data to a recorded area, e.g., A-B area, within the open SRR, the recording/reproducing unit ('10' in FIG. 11) should record the data in the a-b area within the spare area. Either the ISA or OSA can be candidates for the replaced spare area. Since an allocated size of the OSA is generally greater than that of the ISA, LOW replacement recording is preferably performed on the OSA.

Thus, the replacement-recorded management information is managed by TDFL within TDMA as well (which is not shown in the drawing), thereby becoming the information indicating that the C-D area is replaced by the c-d area or the A-B area is replaced by the a-b area.

in case of the open SRR, the replacement recording in the spare area is enabled. This is because the continuity of the user data area can be maintained. Specifically, if a writable area within the open SRR after NWA fails to remain as an area enough to execute the overwrite thereon, the recording/reproducing unit ('10' in FIG. 11) should notify the system that the overwrite failed or replaces the corresponding area by the spare area in the same manner of the closed SRR. Namely, in case of the open SRR, the replacement is not performed after NWA but can be executed on the spare area.

FIG. 9B shows another logical overwrite of a recording in SRM (sequential recording mode) like FIG. 9A.

Referring to FIG. 9B, a LOW execution for an inner circumferential closed SRR of a user data area is performed on an inner spare area (ISA). As information for a disc file system is generally recorded in the inner circumferential closed SRR, the ISA, which is located on the same inner circumference and physically adjacent, is preferably utilized in the case of executing the LOW within the corresponding SRR. The LOW execution for the open SRR is performed by a replacement recording on the NWA or spare area like FIG. 9A.

FIG. 10 is a structural diagram for an overwrite method of a write-once optical disc applicable to random recording mode (RRM) according to another embodiment of the present invention.

Referring to FIG. 10, a random recording mode (RRM) is explained as follows.

The RRM means a system enabled to freely write data in any area within a user data area in recording data in a write-once optical disc. Even if there exists no SRR in the SRM, SBM (space bitmap) information is recorded in TDMA to distinguish a recorded area from a non-recorded area within the disc.

The RRM system of the present invention is characterized in utilizing a spare area in executing a logical overwrite. Namely, in the RRM system, data can be randomly writable on a user data area within a disc, whereby it is difficult to consider a separate replacement area for LOW. Hence, the replacement recording is executed in a manner of utilizing the spare area to which a large size is initially allocated.

The present invention preferentially allocates a sufficient size to an initial allocation of a spare area. Namely, the OSA is allocated as many as N*256 clusters. And, a system is enabled to freely allocate an OSA size within a maximum N=768 ('max_N=768'). It can be seen that the RRM system needs the OSA more than the SRM system (FIG. 9A, FIG. 9B) does. This is because the RRM system utilizes the spare area for the entire LOW execution.

Moreover, either the ISA or OSA can be candidates for the replaced spare area. Since an allocated size of the OSA is generally greater than that of the ISA, LOW replacement recording is preferably performed on the OSA.

If there exists an overwrite request of data for the C-D area and A-B area of the user data area, the corresponding replacement recording is performed on the c-d area and a-b area within the spare areas, respectively. And, the replacement-recorded management information is managed by TDFL within TDMA as well (which is not shown in the drawing), thereby becoming the information indicating that the C-D and A-B areas are replaced by the c-d and a-b areas, respectively.

Figure 11:
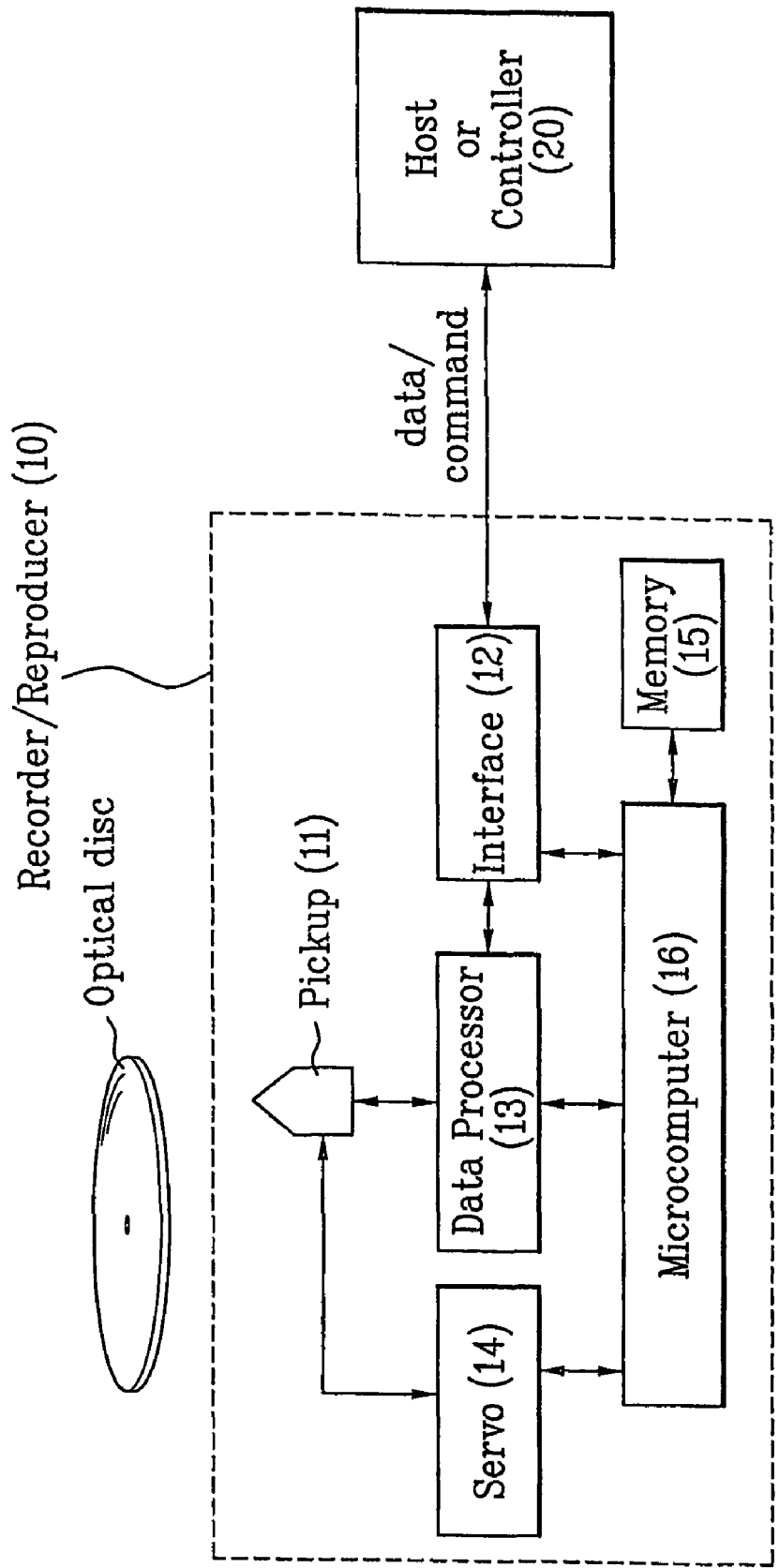
FIG. 11 is a block diagram of a recording/reproducing apparatus for a write-once optical disc according to the present invention.

FIG. 11 is a block diagram of a recording/reproducing apparatus for a write-once optical disc according to the present invention.

Referring to FIG. 11, a recording/reproducing apparatus according to the present invention includes a recording/reproducing unit 10 carrying out a recording/reproducing on an optical disc and a host or control unit 20 controlling the recording/reproducing unit 10.

The control unit 20 issues a recording or reproducing command for a specific area, and the recording/reproducing unit 10 carries out the recording/reproducing on the specific area according to the command of the control unit 20 (also referenced as 'Host or Controller'). Specifically, the recording/ reproducing unit 10 includes an interface unit 12 ('interface') performing communications with an external device, a pickup unit 11 ('pickup') directly recording data on the optical disc or reproducing the data, a data processor 13 receiving a reproducing signal from the pickup unit 11 to restore into a necessary signal value or modulating to deliver a signal to be recorded into a signal to be recorded on the optical disc, a servo unit 14 ('servo') reading out a signal from the optical disc correctly or controlling the pickup unit 11 to record a signal on the optical disc correctly, a memory 15 temporarily storing various informations including a management information and data, and a microcomputer 16 responsible for controlling the above-described elements within the recording/reproducing unit 10.

A reproducing process of a write-once optical disc according to the present invention is explained in detail as follows.

First of all, the entire disc management information within the disc is read out to be temporarily stored in the memory 15 of the recording/reproducing unit 10. And, various kinds of the disc management information are utilized for the recording/reproducing of the optical disc. In the case of intending to perform a recording on a specific area within the optical disc, the control unit 20 makes such an intent into a recording command to deliver to the recording/reproducing unit 10 together with data for writing location information to be recorded. After having received the recording command, the microcomputer 16 within the recording/reproducing unit 10 decides whether a recording-requested area within the optical disc is a recorded area or a non-recorded area from the management informations stored in the memory 15. If it is the non-recorded area, the microcomputer 16 executes the recording according to the recording command of the control unit 20. If it is the recorded area, a replacement recording is performed on another area within a data area. In doing so, the replacement recording is performed in a manner for securing the continuity of the user data area after completion of the replacement recording.

Moreover, in the replacement recording for a logical overwrite (LOW), a replaced area can be differentiated according to a recording mode.

Namely, once a disc is loaded, a recording mode of the loaded disc is preferentially confirmed. In doing so, the recording mode is indicated by 'recording mode' information within TDMA. For instance, in the sequential recording mode (SRM), the replacement recording is performed on an NWA location within a corresponding open SRR in case of intending to execute a LOW for the open SRR. And, the replacement recording is performed on a spare area in case of intending to execute a LOW for the closed SRR. Moreover, if the loaded disc is in a random recording mode (RRM), the replacement recording is always performed on the spare area for the LOW execution.

Meanwhile, the recording/reproducing apparatus allocates a spare area upon disc initialization by taking the LOW execution into consideration. Specifically, the apparatus sufficiently allocates N*256 clusters (Max_N=768) to a size of an outer spare area (OSA), thereby enabling the apparatus to secure a sufficient size for preventing any problem from occurring in future LOW execution.

Therefore, the present invention enables the logical overwrite in a write-once optical disc so that a user or host can deliver a recording command for a random area to provide the same effect of a rewritable optical disc. Therefore, the present invention considerably enhances efficiency and convenience in using a write-once optical disc.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An overwrite method of an optical disc, comprising the steps of:
confirming whether a recording mode applied to the optical disc is a sequential recording mode by reading recording mode information recorded in a temporary management area of the optical disc, in which data is recorded sequentially onto sequential recording ranges allocated to a data area of the optical disc, wherein each of the sequential recording ranges is one of an open sequential recording range having a next writable area or a closed sequential recording range having no writable area;
performing an overwrite for an overwrite-requested data onto a replacement recording area,
wherein if the overwrite is requested in an open sequential recording range, a next writable area within the open sequential recording range is identified as the replacement recording area.

2. The overwrite method of claim 1, further comprising;
recording, after performing an overwrite, location information of the replacement recorded area as management information.

3. The method of claim 2, wherein the recording step records the location information in a temporary management area.

4. An apparatus for overwriting data on an optical disc, comprising:
a pickup unit configured to write data on the optical disc; and
a controller, operatively coupled to the pick up unit, configured to control confirming whether a recording mode applied to the optical disc is a sequential recording mode by reading recording mode information recoded in a temporary management area of the optical disc, in which data is recorded sequentially onto sequential recording ranges allocated to a data area of the optical disc, wherein each of the sequential recording ranges is one of an open sequential recording range having a next writable area and a closed sequential recording range having no writable area; and
wherein the controller is also configured to control the pickup unit to perform a replacement recording for an overwrite-requested data onto a replacement recording area, wherein if the overwrite is requested in an open sequential recording range, the controller identifies a next writable area within the open sequential recording range as the replacement recording area.

5. The apparatus of claim 4, wherein said controller configured to control the pickup unit to write location information of the overwrite-requested area and the replacement-recorded area as management information, after execution of the overwrite.

6. The apparatus of claim 5, wherein the controller configured to the pickup unit to write the location information in a temporary management area.

* * * * *